(12) United States Patent
Ohsugi et al.

(10) Patent No.: US 11,710,990 B2
(45) Date of Patent: Jul. 25, 2023

(54) LAMINATED CORE WITH CIRCUMFERENTIALLY SPACED ADHESION PARTS ON TEETH

(71) Applicant: NIPPON STEEL CORPORATION, Tokyo (JP)

(72) Inventors: Yasuo Ohsugi, Tokyo (JP); Ryu Hirayama, Tokyo (JP); Kazutoshi Takeda, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 124 days.

(21) Appl. No.: 17/413,121

(22) PCT Filed: Dec. 17, 2019

(86) PCT No.: PCT/JP2019/049287
§ 371 (c)(1),
(2) Date: Jun. 11, 2021

(87) PCT Pub. No.: WO2020/129937
PCT Pub. Date: Jun. 25, 2020

(65) Prior Publication Data
US 2022/0069640 A1    Mar. 3, 2022

(30) Foreign Application Priority Data
Dec. 17, 2018    (JP) .................................. 2018-235862

(51) Int. Cl.
*H02K 1/12*    (2006.01)

(52) U.S. Cl.
CPC ..................................... *H02K 1/12* (2013.01)

(58) Field of Classification Search
CPC ............ H02K 1/12; H02K 1/18; H02K 1/185; H02K 2201/09; H02K 2201/00
(Continued)

(56) References Cited

U.S. PATENT DOCUMENTS

| 5,994,464 A * | 11/1999 | Ohsawa ................. C08F 291/02 525/85 |
| 2009/0195110 A1 * | 8/2009 | Miyake ................. H02K 15/022 310/216.058 |

(Continued)

FOREIGN PATENT DOCUMENTS

| CN | 102792556 A | 11/2012 |
| EP | 3553799 A1 | 10/2019 |

(Continued)

OTHER PUBLICATIONS

Machine translation of JP-2015136228-A. (Year: 2015).*
(Continued)

*Primary Examiner* — Michael Andrews
(74) *Attorney, Agent, or Firm* — Renner, Otto, Boisselle & Sklar, LLP (57) ABSTRACT

A laminated core includes a plurality of electrical steel sheets stacked in a thickness direction, the electrical steel sheet includes an annular core back part and a plurality of tooth parts that protrude from the core back part in a radial direction and are disposed at intervals in a circumferential direction of the core back part, a fastening part is provided in a portion of the core back part corresponding to the tooth part, and an adhesion part is provided in the tooth part.

10 Claims, 6 Drawing Sheets

(58) Field of Classification Search
USPC .................. 310/216.004, 216.065, 216.048
See application file for complete search history.

(56) References Cited

U.S. PATENT DOCUMENTS

| | | | |
|---|---|---|---|
| 2010/0197830 A1 | 8/2010 | Hayakawa et al. | |
| 2010/0219714 A1* | 9/2010 | Abe ..................... | H02K 1/146 |
| | | | 310/216.048 |
| 2011/0269894 A1 | 11/2011 | Miyamoto | |
| 2012/0088096 A1* | 4/2012 | Takeda ................. | C04B 28/344 |
| | | | 428/327 |
| 2012/0128926 A1 | 5/2012 | Ohishi et al. | |
| 2015/0028717 A1 | 1/2015 | Luo et al. | |
| 2015/0256037 A1 | 9/2015 | Kudose | |
| 2015/0337106 A1 | 11/2015 | Kajihara | |
| 2016/0023447 A1 | 1/2016 | Shimizu | |
| 2017/0117758 A1 | 4/2017 | Nakagawa | |
| 2017/0342519 A1 | 11/2017 | Uesaka et al. | |
| 2018/0030292 A1 | 2/2018 | Gotou | |
| 2018/0056629 A1 | 3/2018 | Hamamura | |
| 2018/0159389 A1 | 6/2018 | Nishikawa | |
| 2018/0212482 A1 | 7/2018 | Nigo | |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004111509 A * | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009-177895 A | 8/2009 |
| JP | 2010-004716 A | 1/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-120299 A | 6/2012 |
| JP | 2013-089883 A | 5/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015136228 A * | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Machine translation of JP-2004111509-A. (Year: 2004).*
"Plaskolite West Optix® CA—41 FDA General Purpose Acrylic Resin", MatWeb.com, Dec. 19, 2022, www.matweb.com/search/Datasheet.aspx?MatGUID=ceec51c04f714fb383d01496424432d9. (Year: 2022).*

(56) References Cited

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.

* cited by examiner

LAMINATED CORE WITH CIRCUMFERENTIALLY SPACED ADHESION PARTS ON TEETH

TECHNICAL FIELD

The present invention relates to a laminated core and an electric motor.

Priority is claimed on Japanese Patent Application No. 2018-235862, filed Dec. 17, 2018, the content of which is incorporated herein by reference.

BACKGROUND ART

In the related art, a laminated core as described in Patent Document 1 below is known. In this laminated core, electrical steel sheets adjacent in a stacking direction are adhered to each other by an adhesion layer.

CITATION LIST

Patent Document

[Patent Document 1]
Japanese Unexamined Patent Application, First Publication No. 2006-353001

SUMMARY OF THE INVENTION

Problems to be Solved by the Invention

There is room for improvement in the magnetic properties of the laminated core of the related art.

The present invention has been made in view of the above circumstances, and an object of the present invention is to improve the magnetic properties.

Means for Solving the Problem

To solve the above problems, the present invention proposes the following means.
(1) A first aspect of the present invention is a laminated core that includes a plurality of electrical steel sheets stacked in a thickness direction, wherein the electrical steel sheet includes an annular core back part and a plurality of tooth parts that protrude from the core back part in a radial direction and are disposed at intervals in a circumferential direction of the core back part, wherein a fastening part is provided in a portion of the core back part corresponding to the tooth part, and wherein an adhesion part is provided in the tooth part.

In general, a region of the core back part not corresponding to any of the tooth parts (a region between adjacent tooth parts) is a path of a magnetic flux. According to this configuration, by providing the fastening part in a portion of the core back part corresponding to the tooth part, it is more difficult to obstruct a magnetic circuit as compared with a case in which the fastening part is provided in the path of the magnetic flux. That is, in a portion of the core back part corresponding to the tooth part, the magnetic flux (the magnetic circuit) generated in the tooth part branches toward both sides thereof in the circumferential direction. Therefore, it is unlikely that the fastening part provided in this portion will affect the magnetic circuit. As a result, the iron loss that is generated in the stator core can be reduced, and the magnetic properties of the laminated core can be improved.

(2) In the laminated core according to (1), the tooth parts may have first tooth part in which the adhesion part is provided and second tooth part in which the adhesion part is not provided.

In general, an adhesive shrinks during curing. Therefore, when the adhesive is provided on the electrical steel sheet, a compressive stress is applied to the electrical steel sheet as the adhesive cures. When a compressive stress is applied, a strain occurs in the electrical steel sheet.

According to this configuration, the adhesion part is provided in the first tooth part, but is not provided in the second tooth part. Therefore, a strain due to the curing of the adhesive does not occur in the second tooth parts. Therefore, the strain that occurs in the entire laminated core can be made smaller.

If all of the tooth parts are adhesively fixed to each other, a strain occurs due to the adhesive provided on all of the tooth parts. If a strain occurs in all of the tooth parts, there is a concern that the iron loss that is generated in the stator core may increase. Therefore, only some of the tooth parts are adhesively fixed. Accordingly, the strain that occurs in the entire stator core can be made smaller.

Further, in the first tooth part in which the adhesion part is provided, the first tooth part is adhered, and thus rising up of the first tooth part does not occur. If a winding is wound around raised tooth parts, the raised tooth part is deformed by the winding, and a stress is applied to the tooth part by the winding. Therefore, it is possible to suppress application of a stress due to the winding to the first tooth part and the influence of this stress on a magnetic field. However, a compressive stress occurs in the first tooth part due to the adhesion part.

On the other hand, a compressive stress does not occur in the second tooth part in which the adhesion part is not provided. However, rising up occurs in the second tooth part, and thus the stress due to the winding is applied to the second tooth part.

According to this configuration, the tooth parts have the first tooth parts and the second tooth parts. Therefore, the compressive stress and the stress due to the winding can be suppressed and balanced. Therefore, it is possible to provide a laminated core having a high performance in which the magnetic properties are further improved.

(3) In the laminated core according to (2), the first tooth parts and the second tooth parts may be disposed alternately in the circumferential direction.

According to this configuration, the first tooth parts to which the compressive stress is applied, but in which the stress due to the winding is suppressed, and the second tooth parts in which the compressive stress does not occur, but to which the stress due to the winding is applied are alternately disposed. Therefore, both stresses can be suppressed in a well-balanced manner.

(4) In the laminated core according to (2) or (3), the fastening part may be provided in the core back part corresponding to the first tooth parts.

In general, when the fastening parts are provided on the electrical steel sheet, the electrical steel sheet is deformed, and thus a strain occurs in the electrical steel sheet.

If the fastening part is provided in the core back part corresponding to all of the tooth parts, there is a concern that the iron loss that is generated in the laminated core may increase. Therefore, the fastening part is provided in only the core back part corresponding to the first tooth part which is a part of the tooth parts. Accordingly, the strain that occurs in the entire laminated core can be made smaller.

(5) In the laminated core according to (2) or (3), the fastening part may be provided in the core back part corresponding to the second tooth part.

If the fastening part is provided in the core back part corresponding to all of the tooth parts, there is a concern that the iron loss that is generated in the laminated core may increase. Therefore, the fastening parts is provided in only the core back part corresponding to the second tooth part which is a part of the tooth parts. Accordingly, the strain that occurs in the entire laminated core can be made smaller.

(6) In the laminated core according to any one of (1) to (5), an average thickness of the adhesion parts may be 1.0 μm to 3.0 μm.

(7) In the laminated core according to any one of (1) to (6), an average tensile modulus of elasticity E of the adhesion parts may be 1500 MPa to 4500 MPa.

(8) In the laminated core according to any one of (1) to (7), the adhesion part may be a room temperature adhesion-type acrylic-based adhesive including SGA made of an elastomer-containing acrylic-based adhesive.

(9) A second aspect of the present invention is an electric motor including the laminated core according to any one of (1) to (8).

According to this configuration, it is possible to improve the magnetic properties of the electric motor.

Effects of the Invention

According to the present invention, it is possible to improve the magnetic properties.

EMBODIMENTS FOR IMPLEMENTING THE INVENTION

Hereinafter, an electric motor according to an embodiment of the present invention will be described with reference to the drawings. In the present embodiment, a motor, specifically, an AC motor will be described as an example of the electric motor. The AC motor is more specifically a synchronous motor, and further more specifically a permanent magnetic electric motor. This type of motor is suitably employed for, for example, an electric vehicle and the like.

Figure 1:
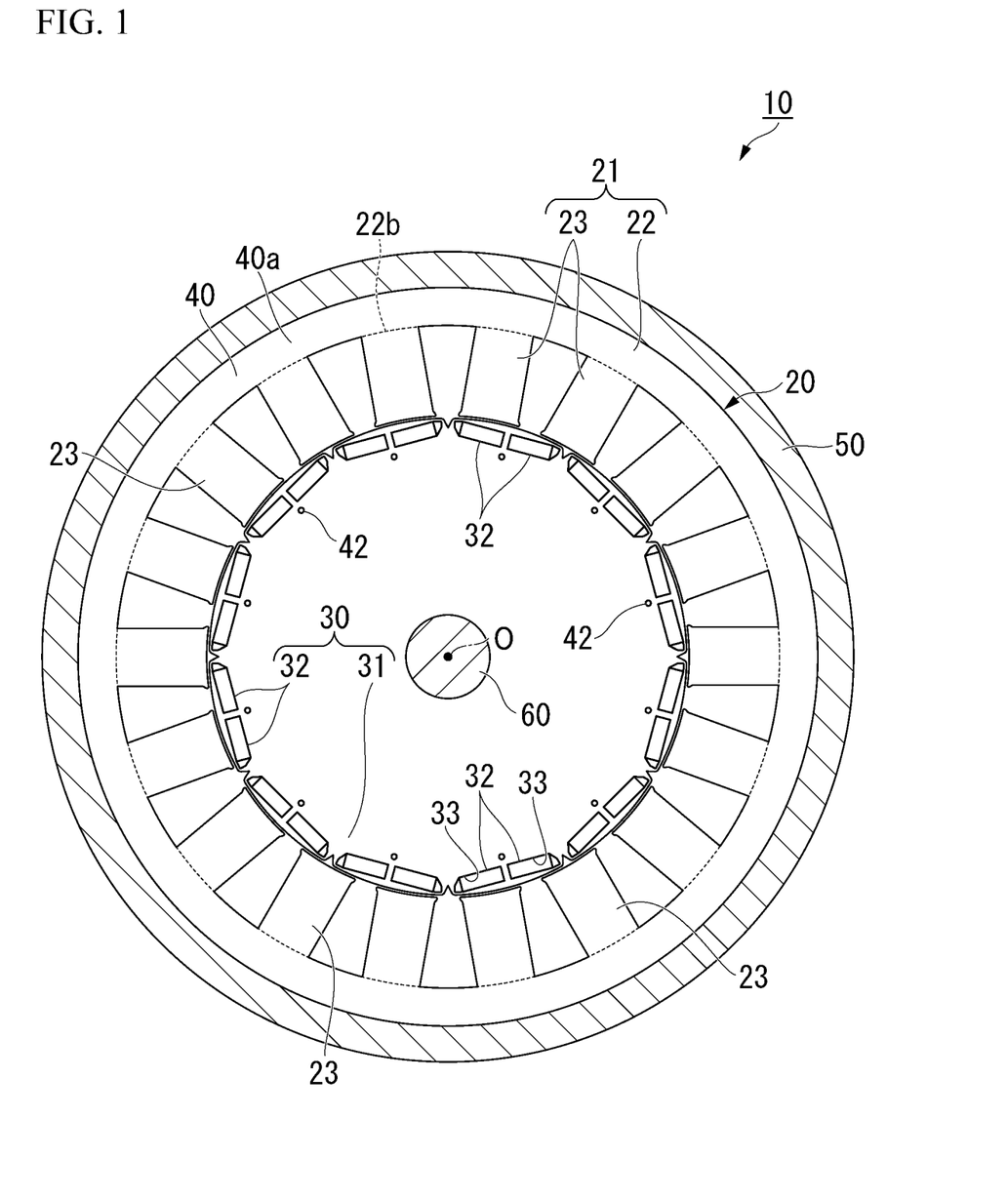
FIG. 1 is a cross-sectional view of an electric motor according to an embodiment of the present invention.
Figure 2:
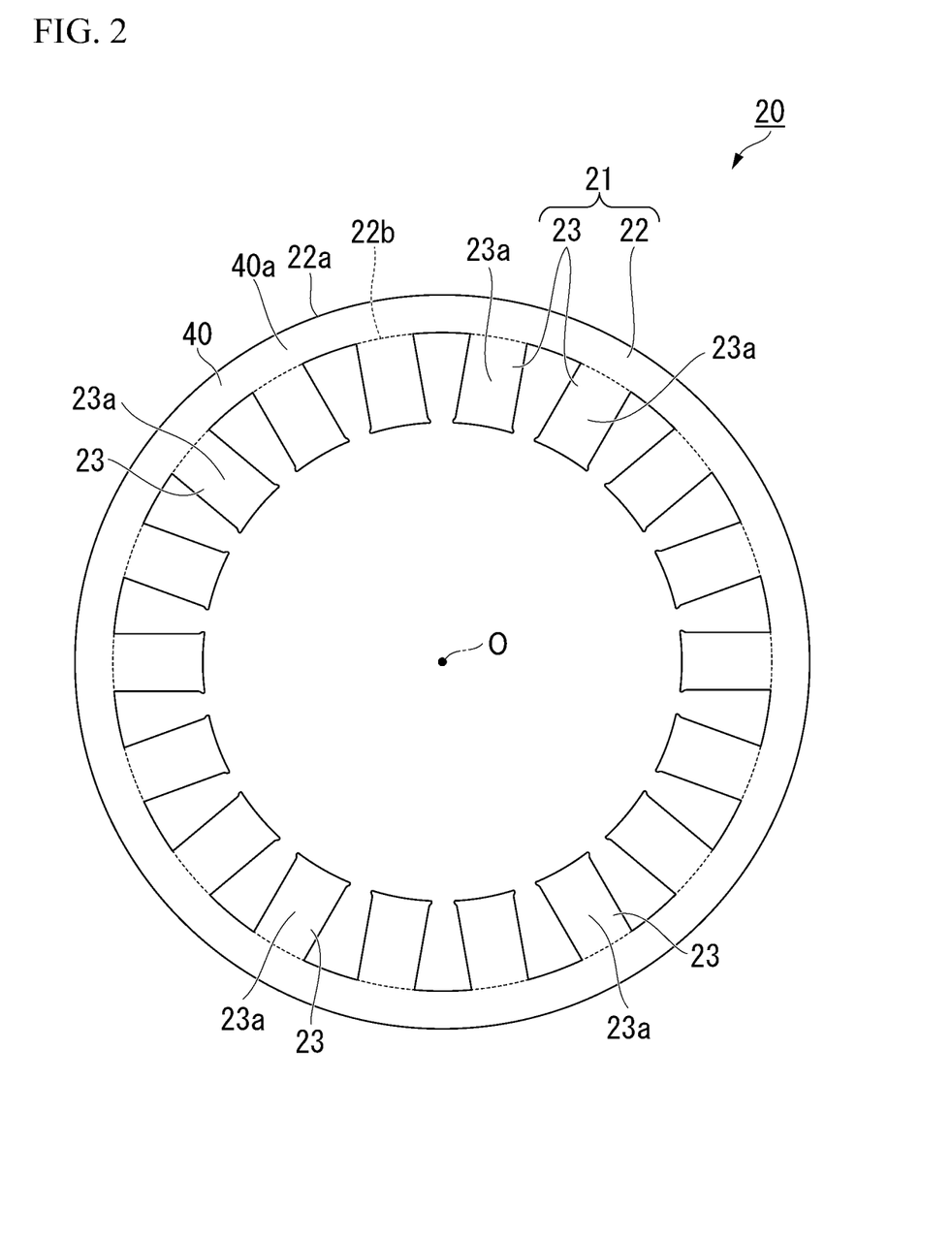
FIG. 2 is a plan view of a stator included in the electric motor shown in FIG. 1.

As shown in FIGS. 1 and 2, an electric motor 10 includes a stator 20, a rotor 30, a casing 50, and a rotary shaft 60. The stator 20 and the rotor 30 are accommodated in the casing 50. The stator 20 is fixed to the casing 50.

In the present embodiment, as the electric motor 10, an inner rotor type electric motor in which the rotor 30 is located inside the stator 20 is used. However, as the electric motor 10, an outer rotor type electric motor in which the rotor 30 is located outside the stator 20 may be used. Further, in the present embodiment, the electric motor 10 is a three-phase AC motor with twelve poles and eighteen slots. However, for example, the number of poles, the number of slots, the number of phases, and the like can be appropriately changed.

The stator 20 includes a stator core 21 and a winding (not shown).

The stator core 21 includes an annular core back part 22 and a plurality of tooth parts 23. The core back part 22 is a region surrounded by an outer circumferential edge 22a of the core back part and an inner circumferential edge 22b (a broken line shown in FIG. 2) of the core back part. Hereinafter, an axial direction of the stator core 21 (the core back part 22) (a direction of the central axis O of the stator core 21) is referred to as an axial direction. A radial direction of the stator core 21 (the core back part 22) (a direction orthogonal to the central axis O of the stator core 21) is referred to as a radial direction. A circumferential direction of the stator core 21 (the core back part 22) (a direction of rotation around the central axis O of the stator core 21) is referred to as a circumferential direction.

The core back part 22 is formed in a circular shape in a plan view of the stator 20 in the axial direction.

For example, the tooth part 23 has a rectangular shape in a plan view. The plurality of tooth parts 23 protrude from the core back part 22 in the radial direction (toward the central axis O of the core back part 22 in the radial direction). The plurality of tooth parts 23 are disposed at equal intervals in the circumferential direction. In the present embodiment, eighteen tooth parts 23 are provided every 20 degrees in terms of a central angle centered on the central axis O. The plurality of tooth parts 23 are formed to have the same shape and the same size.

The winding is wound around the tooth parts 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is disposed coaxially with the stator 20 to form an annular shape (a circular shape). The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 form one magnetic pole. A plurality of sets of the permanent magnets 32 are disposed at equal intervals in the circumferential direction. In the present embodiment, twelve sets (twenty four in total) of the permanent magnets 32 are provided every 30 degrees in terms of a central angle centered on the central axis O.

In the present embodiment, as the permanent magnetic electric motor, an interior permanent magnet motor is employed.

In the rotor core 31, a plurality of through holes 33 that penetrate the rotor core 31 in the axial direction are formed. The plurality of through holes 33 are provided corresponding to the plurality of permanent magnets 32. Each permanent magnet 32 is fixed to the rotor core 31 in a state of being disposed in the corresponding through hole 33. For example, an outer surface of the permanent magnet 32 and an inner surface of the through hole 33 are adhered to each other by an adhesive, and thus each permanent magnet 32 is fixed to the rotor core 31. As the permanent magnetic electric motor, a surface permanent magnet motor may be used instead of the interior permanent magnet motor.

Each of the stator core 21 and the rotor core 31 is a laminated core. The laminated core is formed by a plurality of electrical steel sheets 40 being stacked.

The stacking thickness of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on a tip end of the tooth part 23 of the stator core 21. The inner diameter of the stator core 21 is a diameter of a virtual circle inscribed in the tip ends of all of the tooth parts 23.

Each of electrical steel sheets 40 for forming the stator core 21 and the rotor core 31 is formed, for example, by punching an electrical steel sheet serving as a base material. A known electrical steel sheet can be used as the electrical steel sheet 40. The chemical composition of the electrical steel sheet 40 is not particularly limited. In the present embodiment, as the electrical steel sheet 40, a non-grain-oriented electrical steel sheet is employed. As the non-grain-oriented electrical steel sheet, for example, a non-grain-oriented electrical steel strip of Japanese Industrial Standards (JIS) C 2552: 2014 can be employed.

However, as the electrical steel sheet 40, a grain-oriented electrical steel sheet can also be employed instead of a non-grain-oriented electrical steel sheet. As the grain-oriented electrical steel sheet, a JIS C 2553: 2012 grain-oriented electrical steel strip can be employed.

An insulation coating is provided on each of both surfaces of the electrical steel sheet 40 to improve the workability of the electrical steel sheet and to reduce the iron loss of the laminated core. As the substance constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, and the like. Examples of the organic resin include epoxy-based resins, acrylic-based resins, acrylic-styrene-based resins, polyester-based resins, silicone-based resins, fluorine-based resins, and the like.

To ensure the insulation performance between the electrical steel sheets 40 stacked with each other, the thickness of the insulation coating (the thickness per one surface of the electrical steel sheet 40) is preferably 0.1 μm or more.

On the other hand, as the insulation coating becomes thicker, the insulation effect becomes saturated. Further, as the insulation coating becomes thicker, the space factor decreases, and a performance for serving as the laminated core deteriorates. Therefore, it is preferable to form the insulation coating as thin as possible in a range in which the insulation performance can be ensured. The thickness of the insulation coating (the thickness per one surface of the electrical steel sheet 40) is preferably 0.1 or more and 5 μm or less, and more preferably 0.1 μm or more and 2 μm or less.

As the electrical steel sheet 40 becomes thinner, the iron loss improvement effect gradually becomes saturated. Further, as the electrical steel sheet 40 becomes thinner, the manufacturing cost of the electrical steel sheet 40 increases. Therefore, in consideration of the iron loss improvement effect and the manufacturing cost, the thickness of the electrical steel sheet 40 is preferably 0.10 mm or more.

On the other hand, if the electrical steel sheet 40 is too thick, a press punching operation of the electrical steel sheet 40 becomes difficult.

Therefore, in consideration of the press punching operation of the electrical steel sheet 40, the thickness of the electrical steel sheet 40 is preferably 0.65 mm or less.

Further, as the electrical steel sheet 40 becomes thicker, the iron loss increases. Therefore, in consideration of the iron loss characteristics of the electrical steel sheet 40, the thickness of the electrical steel sheet 40 is preferably 0.35 mm or less. The thickness of the electrical steel sheet 40 is more preferably 0.20 mm or 0.25 mm.

In consideration of the above points, the thickness of each electrical steel sheet 40 is, for example, 0.10 mm or more and 0.65 mm or less. The thickness of each electrical steel sheet 40 is preferably 0.10 mm or more and 0.35 mm or less, and more preferably 0.20 mm or 0.25 mm. The thickness of the electrical steel sheet 40 also includes the thickness of the insulation coating.

Figure 3:
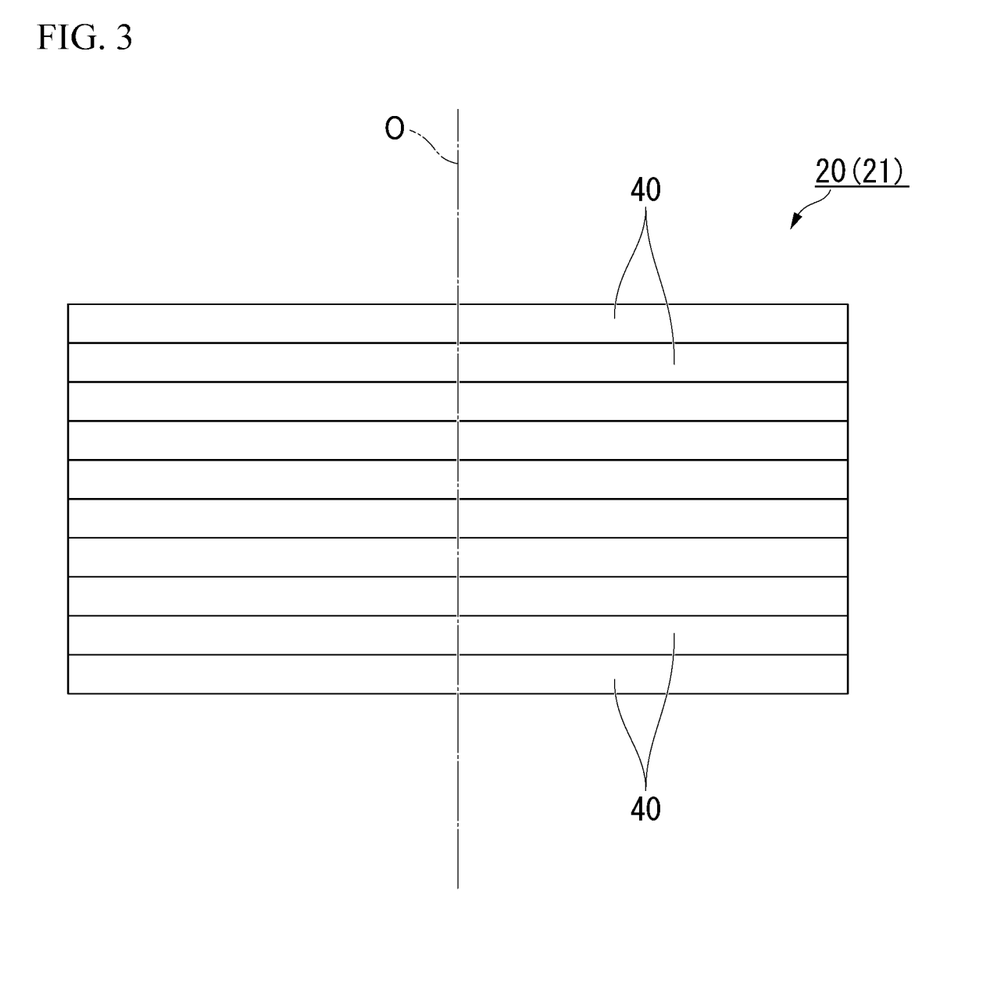
FIG. 3 is a side view of a laminated core according to a first embodiment of the present invention.

As shown in FIG. 3, the plurality of electrical steel sheets 40 for forming the stator core 21 are stacked in a thickness direction. The thickness direction is a thickness direction of the electrical steel sheet 40. The thickness direction corresponds to a stacking direction of the electrical steel sheets 40. The plurality of electrical steel sheets 40 are disposed coaxially with the central axis O. The electrical steel sheet 40 includes the core back part 22 and the plurality of tooth parts 23.

Figure 4:
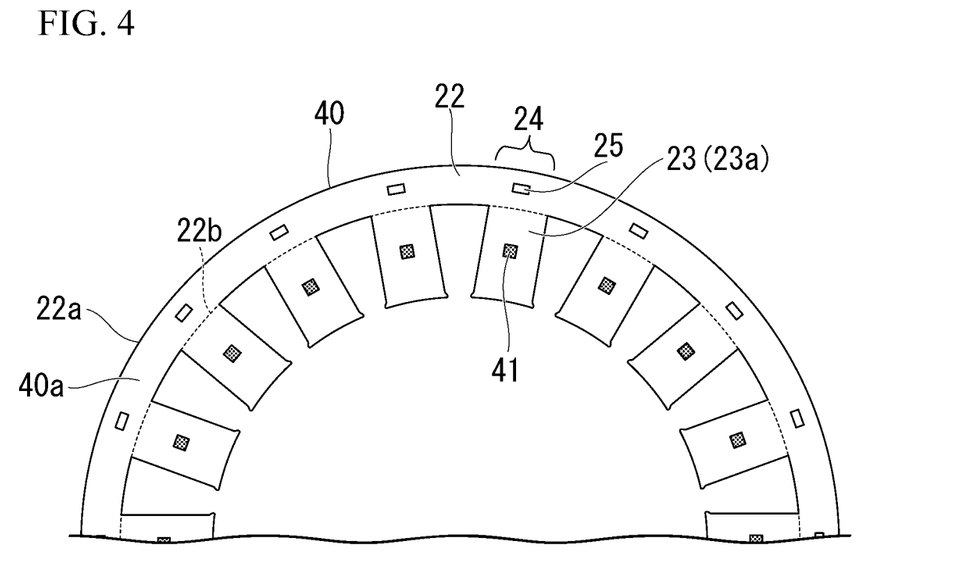
FIG. 4 is a plan view of a first surface of an electrical steel sheet in the laminated core according to the first embodiment of the present invention.

As shown in FIG. 4, the plurality of electrical steel sheets 40 for forming the stator core 21 are fixed to each other by adhesion parts 41 and fastening parts 25 which are provided on a surface (a first surface) 40a of the electrical steel sheet 40.

For example, although not shown, the fastening part 25 is constituted by a convex part (a dowel) and a concave part which are formed in the electrical steel sheet 40. The convex part protrudes from the electrical steel sheet 40 in the stacking direction. The concave part is disposed in a portion of the electrical steel sheet 40 which is located on a back side of the convex part. The concave part is recessed in the stacking direction with respect to the surface of the electrical steel sheet 40. The convex part and the concave part are formed, for example, by a process of pressing the electrical steel sheet 40.

Out of a pair of electrical steel sheets 40 overlapping in the stacking direction, the convex part of the fastening part 25 of one electrical steel sheet 40 fits into the concave part of the fastening part 25 of the other electrical steel sheet 40.

As shown in FIG. 4, the fastening part 25 is provided in a portion 24 of the core back part 22 of the electrical steel sheet 40 corresponding to the tooth part 23. The adhesion part 41 is provided on a surface to be adhered of the tooth part 23 (a surface 23a shown in FIG. 4). The portion 24 of the core back part 22 corresponding to the tooth part 23 is a portion interposed between a pair of reference lines in the core back part 22 which extend outward from both side edges of the tooth part 23 in the radial direction in a plan view in the stacking direction. Each pair of reference lines extends in the radial direction. The state in which the fastening part 25 is provided in the portion 24 of the core back part 22 corresponding to the tooth part 23 means a state in which each fastening part 25 is provided such that the whole of each fastening part 25 is located inside the portion interposed between the pair of reference lines in the core back part 22. As described above, the tooth parts 23 are portions that protrude from the core back part 22 in the radial direction. In FIG. 4, the adhesion parts 41 are provided in all of the tooth parts 23. The adhesion part 41 is disposed at a central portion of the tooth part 23.

The fastening part 25 and the adhesion part 41 are disposed on the virtually same straight line extending in the radial direction. The fastening part 25 and the adhesion part 41 are disposed at a position corresponding to a center of the tooth part 23 in the circumferential direction. The fastening part 25 is disposed at a center of the core back part 22 in the radial direction.

The fastening part 25 is preferably disposed in the vicinity of an outer circumferential edge of the core back part 22. The vicinity of the outer circumferential edge of the core back part 22 as used herein means a range of 30% of a radial length of the core back part 22 from a radially outer end of the core back part 22.

Figure 5:
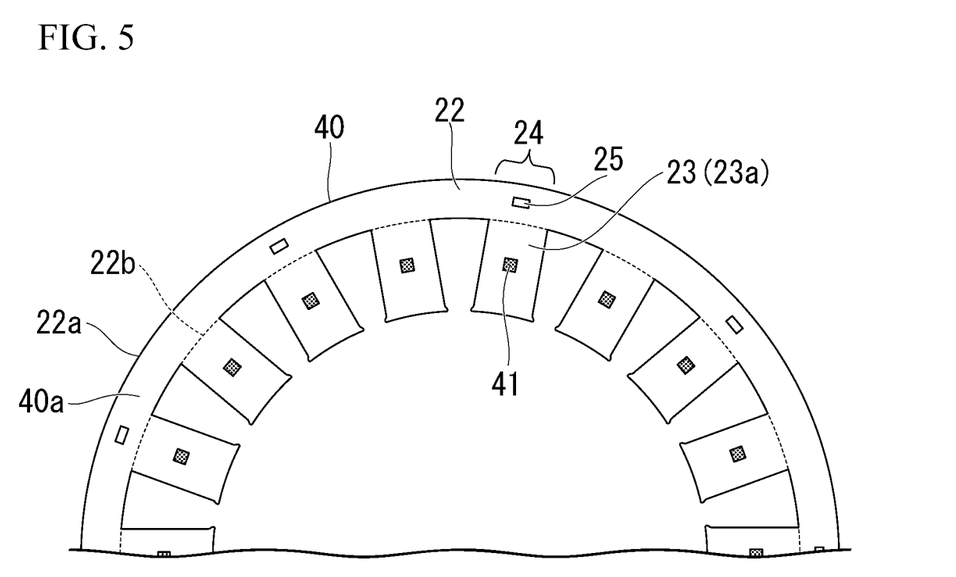
FIG. 5 is a plan view of a first surface of an electrical steel sheet in a laminated core according to a second embodiment of the present invention.

As shown in FIG. 5, in the portion 24 of the core back part 22 of the electrical steel sheet 40 corresponding to the tooth part 23, the fastening part 25 may be provided in every other tooth part 23 in the circumferential direction.

Figure 6:
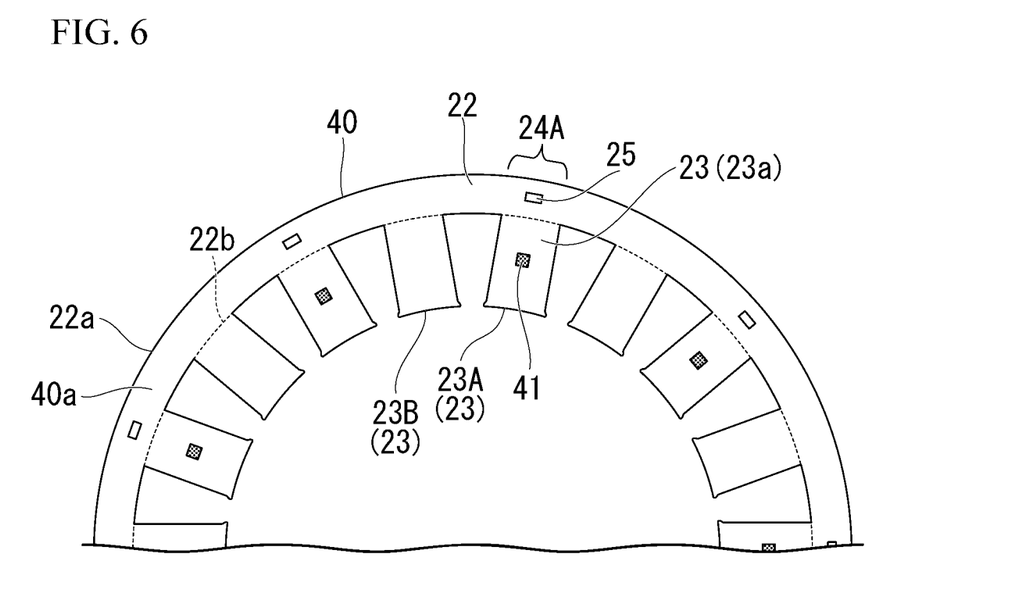
FIG. 6 is a plan view of a first surface of an electrical steel sheet in a laminated core according to a third embodiment of the present invention.

As shown in FIG. 6, the tooth parts 23 of the electrical steel sheet 40 may have first tooth part 23A in which the adhesion part 41 is provided and second tooth part 23B in which the adhesion part 41 is not provided. Further, as shown in FIG. 6, the first tooth parts 23A and the second tooth parts 23B may be disposed alternately in the circumferential direction.

Further, as shown in FIG. 6, the fastening part 25 may be provided in a core back part 24A corresponding to the first tooth part 23A (a portion of the core back part 22 located on a radially outer side of the first tooth part 23A, and hereinafter referred to as "a first core back part"). In this case, the whole of one fastening part 25 may be provided in the first core back part 24A. In general, a region of the core back part not corresponding to any of the tooth parts is a path of a magnetic flux. By providing the whole of one fastening part 25 in the first core back part 24A which is not the path of the magnetic flux, it is possible to make it more difficult for the fastening part 25 to obstruct a magnetic circuit.

Further, the fastening part 25 may be provided in an outer circumferential edge of the first core back part 24A or in a center of the first core back part 24A in the circumferential direction.

Figure 7:
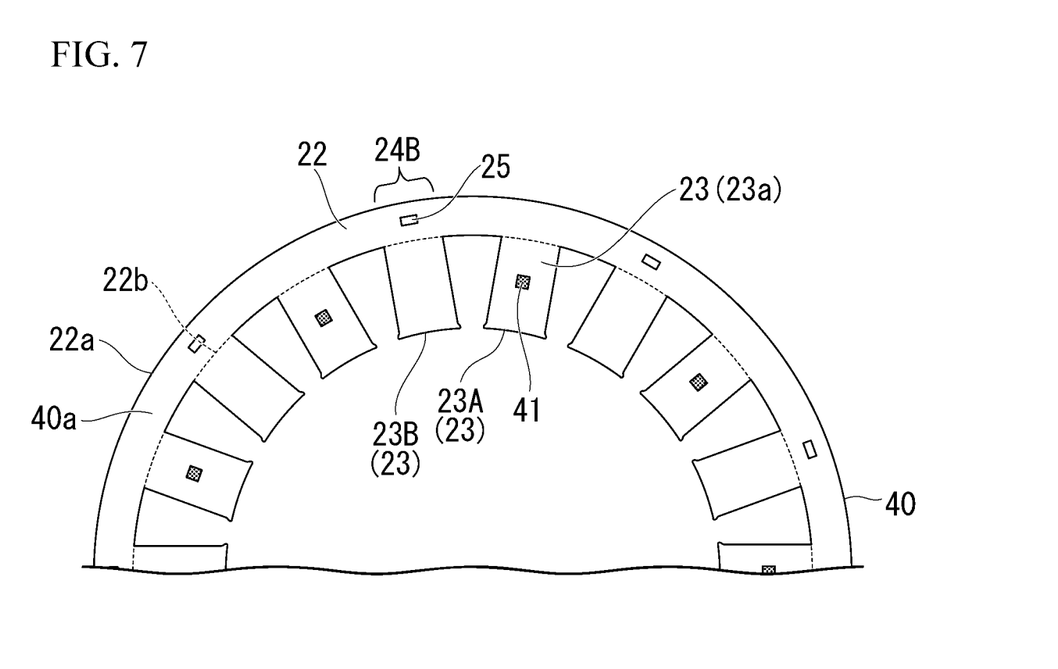
FIG. 7 is a plan view of a first surface of an electrical steel sheet in a laminated core according to a fourth embodiment of the present invention.

As shown in FIG. 7, the tooth parts 23 of the electrical steel sheet 40 may have the first tooth part 23A in which the adhesion part 41 is provided and the second tooth part 23B in which the adhesion part 41 is not provided. Further, as shown in FIG. 7, the first tooth parts 23A and the second tooth parts 23B may be disposed alternately in the circumferential direction.

Further, as shown in FIG. 7, the fastening parts 25 may be provided in a core back part 24B corresponding to the second tooth part 23B (hereinafter referred to as "a second core back part"). In this case, the whole of one fastening part 25 may be provided in the second core back part 24B. By providing the whole of one fastening part 25 in the second core back part 24B which is not the path of the magnetic flux, it is possible to make it more difficult for the fastening part 25 to obstruct a magnetic circuit.

Further, the fastening part 25 may be provided in an outer circumferential edge of the second core back part 24B or in a center of the second core back part 24B in the circumferential direction.

A plurality of the adhesion parts 41 adhere the electrical steel sheets 40 adjacent in the stacking direction to each other.

The adhesion part 41 is an adhesive that is provided between the electrical steel sheets 40 adjacent in the stacking direction and has cured without being divided. As the adhesive, for example, a thermosetting type adhesive by polymer bonding and the like is used.

As a composition of the adhesive, (1) an acrylic-based resin, (2) an epoxy-based resin, (3) a composition containing an acrylic-based resin and an epoxy-based resin, and the like can be applied.

As the adhesive, in addition to the thermosetting type adhesive, a radical polymerization type adhesive and the like can also be used. From the viewpoint of productivity, a room temperature curing type (a room temperature adhesion type) adhesive is desirable. The room temperature curing type adhesive is an adhesive that cures at 20° C. to 30° C. In addition, in the present specification, a value range represented using "to" means a range including values before and after "to" as a lower limit value and an upper limit value.

As the room temperature curing type adhesive, an acrylic-based adhesive is preferable. Typical acrylic-based adhesives include a second generation acrylic-based adhesive (SGA) and the like. Any one of an anaerobic adhesive, an instant adhesive, and an elastomer-containing acrylic-based adhesive can be used as long as the effects of the present invention are not impaired.

The adhesive referred to here refers to an adhesive in a state before curing. After the adhesive cures, it becomes the adhesion part 41.

An average tensile modulus of elasticity E of the adhesion parts 41 at room temperature (20° C. to 30° C.) is in the range of 1500 MPa to 4500 MPa. If the average tensile modulus of elasticity E of the adhesion parts 41 is less than 1500 MPa, a problem that the rigidity of the laminated core is lowered occurs. Therefore, a lower limit of the average tensile modulus of elasticity E of the adhesion parts 41 is 1500 MPa, and more preferably 1800 MPa. On the contrary, if the average tensile modulus of elasticity E of the adhesion parts 41 exceeds 4500 MPa, a problem that the insulation coating formed on the surface of the electrical steel sheet 40 is peeled off occurs. Therefore, an upper limit of the average tensile modulus of elasticity E of the adhesion parts 41 is 4500 MPa, and more preferably 3650 MPa.

The average tensile modulus of elasticity E is measured by a resonance method. Specifically, a tensile modulus of elasticity is measured in conformity with JIS R 1602: 1995.

More specifically, first, a sample for measurement (not shown) is made. This sample is obtained by adhering two electrical steel sheets 40 to each other by the adhesive to be measured and curing the adhesive to form the adhesion part 41. In a case in which the adhesive is a thermosetting type adhesive, this curing is performed by heating and pressurizing under heating and pressurizing conditions in actual operation. On the other hand, in a case in which the adhesive is a room temperature curing type adhesive, the curing is performed by pressurizing at room temperature.

Then, the tensile modulus of elasticity of this sample is measured by a resonance method. As described above, a method of measuring a tensile modulus of elasticity by the resonance method is performed in conformity with JIS R 1602: 1995. After that, the tensile modulus of elasticity of the adhesion parts 41 alone is obtained by removing the influence of the electrical steel sheet 40 itself from the tensile modulus of elasticity (the measured value) of the sample by calculation.

The tensile modulus of elasticity thus obtained from the sample is equal to an average value for the stator core 21 as a whole, which is a laminated core. Therefore, this value is regarded as the average tensile modulus of elasticity E. The composition of the average tensile modulus of elasticity E is set such that the average tensile modulus of elasticity E is hardly changed depending on a stacking position in the stacking direction and a circumferential position around the central axis of the stator core 21. Therefore, a value obtained by measuring the tensile modulus of elasticity of the cured adhesion part 41 at an upper end position of the stator core 21 can be regarded as the average tensile modulus of elasticity E.

As an adhesion method using a thermosetting type adhesive, for example, a method of applying an adhesive to the electrical steel sheets 40, and then adhering the electrical steel sheets 40 to each other by either one or both of heating and press-stacking can be employed. As a heating means, for example, a method of heating in a high temperature tank or an electric furnace, a method of directly energizing, or the like is used. The heating means may be any means.

To obtain stable and sufficient adhesion strength, the thickness of the adhesion part 41 is preferably 1 μm or more.

On the other hand, when the thickness of the adhesion parts 41 exceed 100 μm, an adhesion force becomes saturated. Further, as the adhesion part 41 becomes thicker, the space factor decreases, and the magnetic properties of the laminated core in the iron loss and the like deteriorates.

Therefore, the thickness of the adhesion part 41 is 1 μm or more and 100 μm or less. The thickness of the adhesion part 41 is more preferably 1 μm or more and 10 μm or less.

In the above, the thickness of the adhesion part 41 means an average thickness of the adhesion part 41.

The average thickness of the adhesion part 41 is more preferably 1.0 μm or more and 3.0 μm or less. If the average thickness of the adhesion part 41 is less than 1.0 μm, a sufficient adhesion force cannot be secured as described above. Therefore, a lower limit of the average thickness of the adhesion part 41 is 1.0 μm, and more preferably 1.2 μm. On the contrary, if the average thickness of the adhesion part 41 becomes thicker than 3.0 μm, problems such as a large increase in a strain amount of the electrical steel sheet 40 due to shrinkage during thermosetting occur. Therefore, an upper limit of the average thickness of the adhesion part 41 is 3.0 μm, and more preferably 2.6 μm.

The average thickness of the adhesion part 41 is an average value for the stator core 21 as a whole. The average thickness of the adhesion part 41 is hardly changed depending on a stacking position in the stacking direction and a circumferential position around the central axis of the stator core 21. Therefore, an average value of values obtained by measuring the thicknesses of the adhesion part 41 at the upper end position in the stator core 21 at ten or more points in the circumferential direction can be regarded as the average thickness of the adhesion part 41.

The average thickness of the adhesion part 41 can be adjusted, for example, by changing the application amount of the adhesive. Further, for example, in a case of a thermosetting type adhesive, the average tensile modulus of elasticity E of the adhesion parts 41 can be adjusted by changing either one or both of heating and pressurizing conditions applied at the time of adhesion and the type of a curing agent.

In the present embodiment, the plurality of electrical steel sheets 40 for forming the rotor core 31 are fixed to each other by fastening parts 42 (dowels, see FIG. 1). However, the plurality of electrical steel sheets 40 for forming the rotor core 31 may be stacked via the adhesion parts 41.

The laminated core such as the stator core 21 and the rotor core 31 may be formed by so-called the rotationally-stacking.

As described above, in the stator core 21 (the laminated core) according to the present embodiment, the fastening part 25 is provided in a portion of the core back part 22 of the electrical steel sheet 40 corresponding to the tooth part 23. The adhesion parts 41 is provided in the tooth part 23. The tooth parts 23 of the electrical steel sheets 40 adjacent in the stacking direction are partially adhered to each other.

In general, a region of the core back part not corresponding to any of the tooth parts (a region between the adjacent tooth parts) is a path of a magnetic flux. Therefore, by providing the fastening part 25 in a portion of the core back part 22 corresponding to the tooth part 23 as in the stator core 21 of the present embodiment, it is more difficult to obstruct a magnetic circuit as compared with a case in which the fastening part 25 is provided in the path of the magnetic flux. That is, in a portion of the core back part 22 corresponding to the tooth part 23, the magnetic flux (the magnetic circuit) generated in the tooth part 23 branches toward both sides thereof in the circumferential direction. Therefore, it is unlikely that the fastening part 25 provided in this portion will affect the magnetic circuit. As a result, the iron loss that is generated in the stator core 21 can be reduced, and the magnetic properties of the stator core 21 can be improved.

In general, an adhesive shrinks during curing. Therefore, when the adhesive is provided on the electrical steel sheet, a compressive stress is applied to the electrical steel sheet as the adhesive cures. When a compressive stress is applied, a strain occurs in the electrical steel sheet. Further, when the fastening parts are provided on the electrical steel sheet, the electrical steel sheet is deformed, and thus a strain occurs in the electrical steel sheet. The fastening parts and an adhesion region form a fixing part. The fixing part fixes the electrical steel sheets adjacent in the stacking direction to each other. As the area of the fixing part increases, the strain of the electrical steel sheet increases.

In the stator core 21 (the laminated core) according to the present embodiment, the tooth parts 23 of the electrical steel sheet 40 have the first tooth part 23A in which the adhesion part 41 is provided and the second tooth part 23B in which the adhesion part 41 is not provided. Therefore, the strain due to the curing of the adhesive does not occur in the second tooth part 23B. Accordingly, the area of the fixing part in a plan view in the stacking direction is reduced. Therefore, the strain that occurs in the entire stator core 21 can be made smaller.

If all of the tooth parts 23 are adhesively fixed to each other, a strain occurs due to the adhesive provided on all of the tooth parts 23. If a strain occurs in all of the tooth parts 23, there is a concern that the iron loss that is generated in the stator core 21 may increase. Therefore, only some of the tooth parts 23 are adhesively fixed. Therefore, the area of the fixing part that fixes the electrical steel sheets 40 adjacent in the stacking direction is reduced. Accordingly, the strain that occurs in the entire stator core 21 can be made smaller.

Further, in the first tooth part 23A in which the adhesion part 41 is provided, the first tooth part 23A is adhered, and thus rising up of the first tooth part 23A does not occur. If a winding is wound around raised tooth part, the raised floating tooth part is deformed by the winding, and a stress is applied to the tooth part by the winding. Therefore, it is possible to suppress the application of a stress due to the winding to the first tooth part 23A and the influence of this stress on a magnetic field. However, a compressive stress occurs in the first tooth part 23A due to the adhesion parts 41.

On the other hand, a compressive stress does not occur in the second tooth part 23B in which the adhesion part 41 is not provided. However, the rising up occurs in the second tooth part 23B, and thus the stress due to the winding is applied to the second tooth part 23B.

According to this configuration, the tooth parts 23 have the first tooth parts 23A and the second tooth parts 23B. Therefore, the compressive stress and the stress due to the winding can be suppressed and balanced. Therefore, it is possible to provide a stator core 21 having a high performance in which the magnetic properties are further improved.

In the stator core 21 (the laminated core) according to the present embodiment, the first tooth parts 23A and the second tooth parts 23B are disposed alternately in the circumferential direction.

According to this configuration, the first tooth parts 23A to which the compressive stress is applied, but in which the stress due to the winding is suppressed, and the second tooth parts 23B in which the compressive stress does not occur, but to which the stress due to the winding is applied are alternately disposed. Therefore, both stresses can be suppressed in a well-balanced manner.

In the stator core 21 (the laminated core) according to the present embodiment, the fastening part 25 is provided in the first core back part 24A corresponding to the first tooth part 23A.

If the fastening parts 25 are provided in the core back part 22 corresponding to all of the tooth parts 23, there is a concern that the iron loss that is generated in the stator core 21 may increase. Therefore, the fastening part 25 is provided in only the first core back part 24A corresponding to the first tooth part 23A which is a part of the tooth parts 23. Therefore, the area of the fixing part is reduced. Accordingly, the strain that occurs in the entire stator core 21 can be made smaller.

In the stator core 21 (the laminated core) according to the present embodiment, the fastening part 25 is provided in the second core back part 24B corresponding to the second tooth part 23B.

If the fastening parts 25 are provided in the core back part 22 corresponding to all of the tooth parts 23, there is a concern that the iron loss that is generated in the stator core 21 may increase. Therefore, the fastening part 25 is provided in only the second core back part 24B corresponding to the second tooth parts 23B which is a part of the tooth parts 23. Therefore, the area of the fixing part is reduced. Accordingly, the strain that occurs in the entire stator core 21 can be made smaller.

The electric motor 10 according to the present embodiment includes the stator core 21 (the laminated core) according to the present embodiment. Therefore, it is possible to improve the magnetic properties of the electric motor 10.

The technical scope of the present invention is not limited to the above-described embodiments, and various modifications can be made without departing from the gist of the present invention.

The shape of the stator core is not limited to the forms shown in the above-described embodiments. Specifically, the dimensions of the outer diameter and the inner diameter of the stator core, the stacking thickness, the number of the slots, the dimensional ratio of the tooth part in the circumferential direction and the radial direction, the dimensional ratio between the tooth part and the core back part in the radial direction, and the like can be arbitrarily designed according to the properties of the desired electric motor.

In the rotor of the above-described embodiments, a set of two permanent magnets 32 form one magnetic pole, but the present invention is not limited to this. For example, one permanent magnet 32 may form one magnetic pole, or three or more permanent magnets 32 may form one magnetic pole.

In the above-described embodiments, the permanent magnetic electric motor has been described as an example of the electric motor, but the structure of the electric motor is not limited to this as will be illustrated below. As the structure of the electric motor, various known structures that will not be illustrated below can also be employed.

In the above-described embodiments, the permanent magnetic electric motor has been described as an example of the synchronous motor. However, the present invention is not limited to this. For example, the electric motor may be a reluctance motor or an electromagnet field motor (a wound-field motor).

In the above-described embodiments, the synchronous motor has been described as an example of the AC motor. However, the present invention is not limited to this. For example, the electric motor may be an induction motor.

In the above-described embodiments, the AC motor has been described as an example of the motor. However, the present invention is not limited to this. For example, the electric motor may be a DC motor.

In the above-described embodiments, the motor has been described as an example of the electric motor. However, the present invention is not limited to this. For example, the electric motor may be an electric generator.

In the above-described embodiments, the case in which the laminated core according to the present invention is applied to the stator core has been illustrated. The laminated core according to the present invention can also be applied to the rotor core.

In addition, it is possible to appropriately replace the configuration elements in the above-described embodiments with well-known configuration elements without departing from the gist of the present invention. Further, the above-described modification examples may be appropriately combined.

EXAMPLES

Hereinafter, the present invention will be described more specifically with examples and a comparative example, but the present invention is not limited to the following examples.

Example 1

As shown in FIG. 4, the fastening part 25 was provided in the portion 24 of the core back part 22 of the electrical steel sheet 40 corresponding to the tooth part 23. Further, the adhesion part 41 was provided on the surface 23a of the tooth part 23. The plurality of electrical steel sheets 40 provided with the fastening parts 25 and the adhesion parts 41 were stacked to form the laminated core.

Two types of laminated cores having different sheet thicknesses of the electrical steel sheet 40 were formed using the electrical steel sheet 40 having a sheet thickness of 0.20 mm and the electrical steel sheet 40 having a sheet thickness of 0.25 mm.

Example 2

As shown in FIG. 5, in the portion 24 of the core back part 22 of the electrical steel sheet 40 corresponding to the tooth part 23, the fastening part 25 was provided in every other tooth part 23 in the circumferential direction. Except for this point, as in Example 1, two types of laminated cores having different sheet thicknesses of the electrical steel sheet 40 were formed.

Example 3

As shown in FIG. 6, the tooth parts 23 of the electrical steel sheet 40 were configured to have the first tooth part 23A in which the adhesion part 41 is provided and the second tooth part 23B in which the adhesion part 41 is not provided. Further, the first tooth parts 23A and the second tooth parts 23B were disposed alternately in the circumferential direction. Further, the fastening part 25 was provided in the first core back part 24A corresponding to the first tooth part 23A.

In other points, as in Example 1, two types of laminated cores having different sheet thicknesses of the electrical steel sheet 40 were formed.

Example 4

As shown in FIG. 7, the tooth parts 23 of the electrical steel sheet 40 were configured to have the first tooth part 23A in which the adhesion part 41 is provided and the second tooth part 23B in which the adhesion part 41 is not provided. Further, the first tooth parts 23A and the second tooth parts 23B are disposed alternately in the circumferential direction. Further, the fastening part 25 was provided in the second core back part 24B corresponding to the second tooth part 23B.

In other points, as in Example 1, two types of laminated cores having different sheet thicknesses of the electrical steel sheet 40 were formed.

Comparative Example

Figure 8:
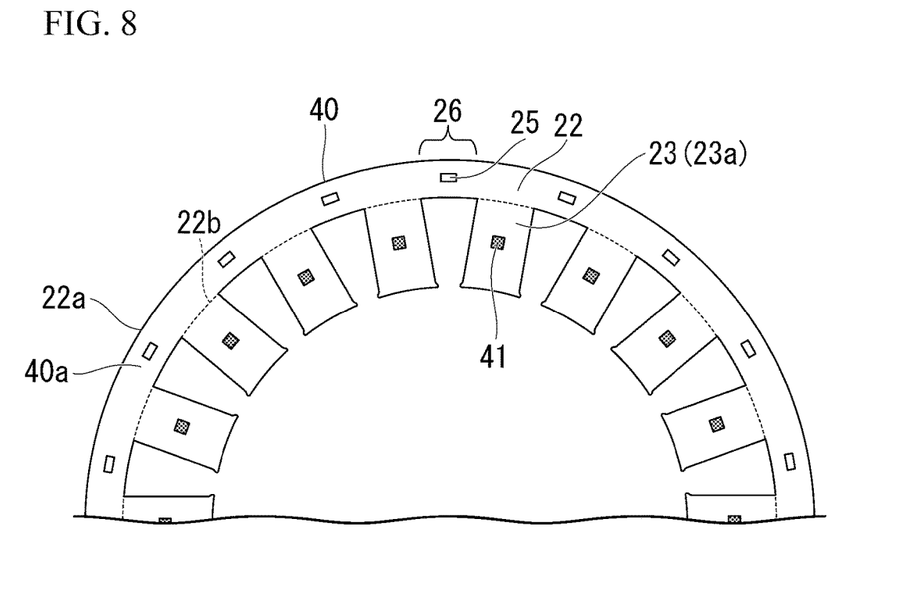
FIG. 8 is a plan view of a first surface of an electrical steel sheet in a laminated core according to a comparative example.

As shown in FIG. 8, the fastening part 25 was provided in a portion 26 of the core back part 22 of the electrical steel sheet 40 not corresponding to the tooth part 23. The adhesion part 41 was provided on the surface 23a of the tooth part 23. Except for these points, as in Example 1, two types of laminated cores having different sheet thicknesses of the electrical steel sheet 40 were formed. The portion 26 of the core back part 22 not corresponding to the tooth part 23 is a portion of the core back part 22 which is not on an outer side of the tooth part 23 in the radial direction.

Evaluation of Iron Loss

In the laminated cores manufactured in Examples 1 to 4 and the comparative example, an excitation current having an effective value of 10 A and a frequency of 100 Hz was applied to the winding of each phase. Then, the iron loss was evaluated under the condition that the rotation speed of the rotor was set to 1000 rpm.

The evaluation of the iron loss was executed by a simulation using software. As the software, electromagnetic field simulation software JMAG which is based on a finite element method and is manufactured by JSOL Corporation was used.

Figure 9:
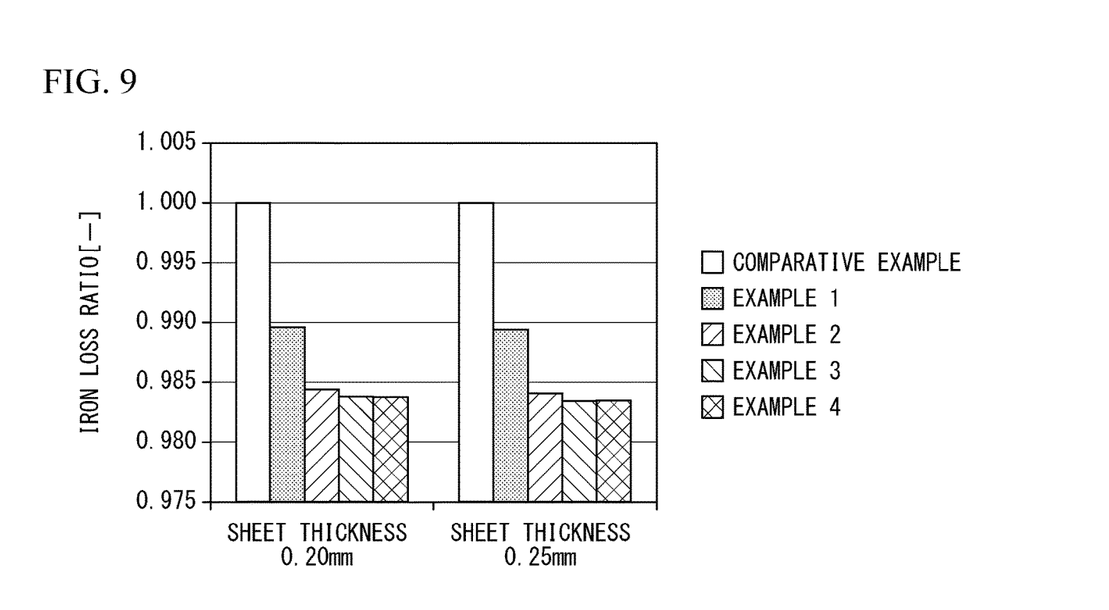
FIG. 9 is a diagram showing relative values of the iron losses of laminated cores of Examples 1 to 4 in a case in which the iron loss of the laminated core of the comparative example is set to 1.

Relative values of the iron losses of laminated cores of Examples 1 to 4 with the iron loss of the laminated core of the comparative example set to 1 are shown in FIG. 9.

From the results of FIG. 9, it was found that the iron losses of the laminated cores of Examples 1 to 4 are lower than that of the laminated core of the comparative example regardless of the thickness of the electrical steel sheet 40.

Therefore, it was found that in the laminated cores of Examples 1 to 4, it is unlikely that the fastening part will affect the magnetic circuit due to the provision of the fastening part in the portion of the core back part corresponding to the tooth part. Then, it was found that the loss that is generated in the laminated core can be reduced and the magnetic properties of the laminated core can be improved.

INDUSTRIAL APPLICABILITY

According to the present invention, it is possible to provide a laminated core having improved magnetic properties and an electric motor including the laminated core. Therefore, the industrial applicability is great.

BRIEF DESCRIPTION OF THE REFERENCE SYMBOLS

10 Electric motor
20 Stator
21 Stator core (laminated core)
22 Core back part
23 Tooth part
23A First tooth part
23B Second tooth part
25 Fastening part
30 Rotor
31 Rotor core (laminated core)
32 Permanent magnet
33 Through hole
40 Electrical steel sheet
41 Adhesion part
50 Casing
60 Rotary shaft

The invention claimed is:
1. A laminated core comprising a plurality of electrical steel sheets stacked in a thickness direction,
wherein the electrical steel sheet includes an annular core back part and a plurality of tooth parts that protrude from the core back part in a radial direction and are disposed at intervals in a circumferential direction of the core back part,
wherein a fastening part is provided in a portion of the core back part corresponding to the tooth parts,
wherein an adhesion part is provided in the tooth part,
wherein the tooth parts have first tooth part in which the adhesion part is provided and second tooth part in which the adhesion part is not provided, and
wherein the first tooth parts and the second tooth parts are disposed alternately in the circumferential direction.

2. The laminated core according to claim 1, wherein the fastening part is provided in the core back part corresponding to the first tooth part.

3. The laminated core according to claim 2, wherein an average thickness of the adhesion parts is 1.0 μm to 3.0 μm.

4. The laminated core according to claim 1, wherein the fastening part is provided in the core back part corresponding to the second tooth part.

5. The laminated core according to claim 4, wherein an average thickness of the adhesion parts is 1.0 μm to 3.0 μm.

6. The laminated core according to claim 1, wherein an average thickness of the adhesion parts is 1.0 μm to 3.0 μm.

7. The laminated core according to claim 1, wherein an average tensile modulus of elasticity E of the adhesion parts is 1500 MPa to 4500 MPa.

8. The laminated core according to claim 1, wherein the adhesion part is a room temperature adhesion type acrylic-based adhesive including SGA made of an elastomer-containing acrylic-based adhesive.

9. An electric motor comprising the laminated core according to claim 1 and a rotor.

10. The laminated core according to claim 1, wherein an average thickness of the adhesion parts is 1.0 μm to 3.0 μm.

\* \* \* \* \*